Dec. 30, 1930.  A. S. VAN HALTEREN  1,786,794
DEMOUNTABLE WHEEL SPIDER
Filed Jan. 21, 1929
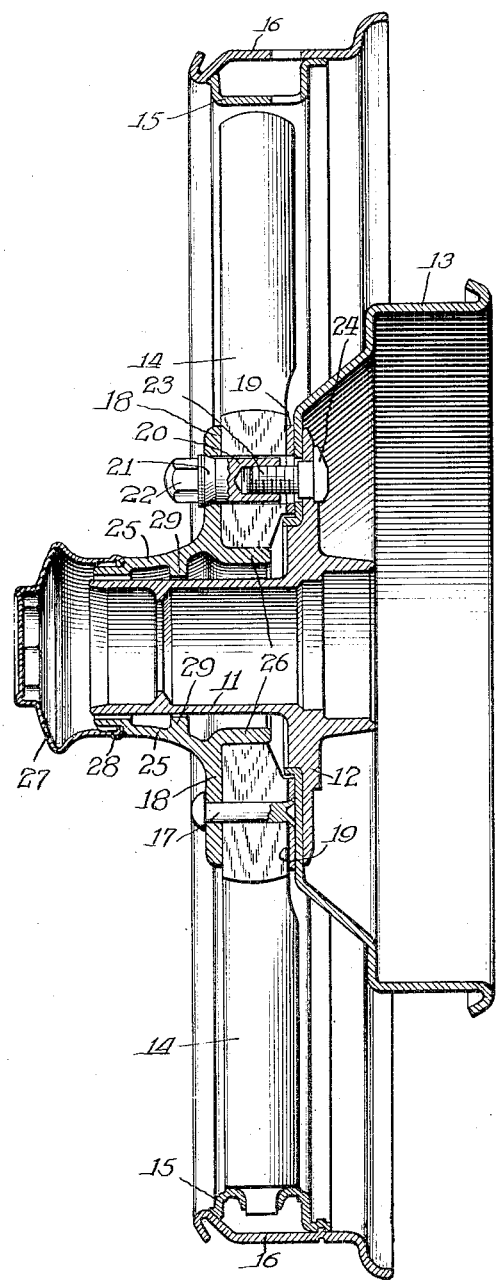
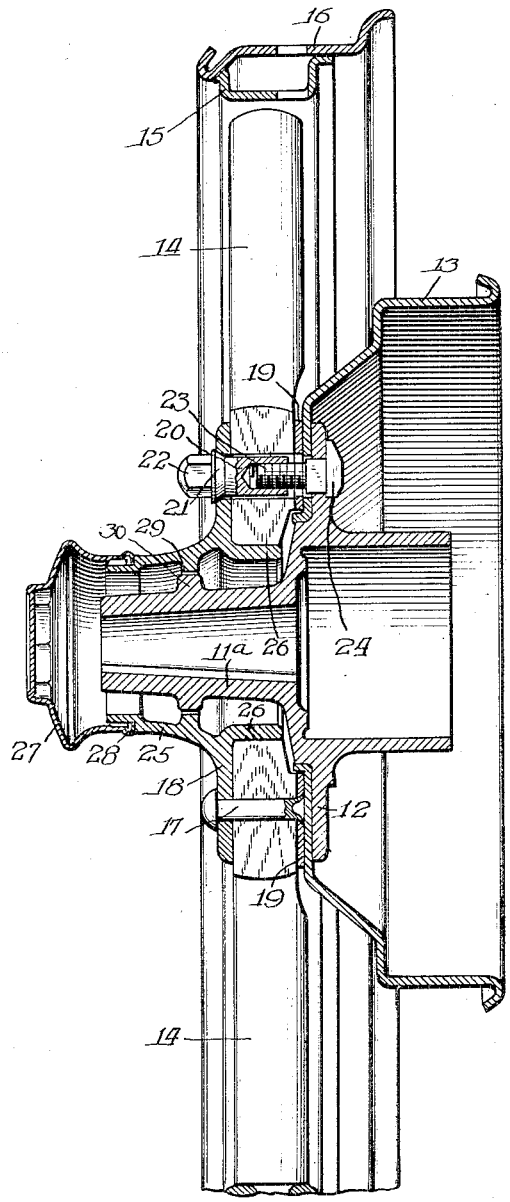
Inventor:
Andrew S. Van Halteren
By Cromwell, Greist & Warden
Attys
Witness:
R. B. Davison Patented Dec. 30, 1930

1,786,794

UNITED STATES PATENT OFFICE

ANDREW S. VAN HALTEREN, OF EAST LANSING, MICHIGAN, ASSIGNOR TO MOTOR WHEEL CORPORATION, OF LANSING, MICHIGAN, A CORPORATION OF MICHIGAN

DEMOUNTABLE WHEEL SPIDER

Application filed January 21, 1929. Serial No. 333,762.

My invention pertains to interchangeable wheel construction, and more particularly to a wood wheel spider or skeleton adapted to be interchanged for a wire wheel upon a hub designed primarily for the latter.

There are certain features of hub design found specially suited to the mounting of wire wheel bodies, and it is the object of the present invention to proceed from the approved wire wheel hub structure as a starting point and develop a wood wheel spider adapted therefor, rather than as has been usual, to work out a compromise wherein structural features found to be desirable in connection with one type of wheel are sacrificed in a measure to harmonize with features of another type, wherein the result does not represent the most satisfactory construction for either.

In the present illustrative instance the hub and brake drum construction of the well known Ford wire wheel is the starting point, and the invention is represented in a wood wheel spider so designed as to be interchangeable on such hub for the Ford wire wheel without sacrificing in any degree but rather utilizing to the full extent the elements of efficiency attaching to wood wheel construction as developed through many years.

The Ford type for wire wheels was not designed for nor is it adapted to interchangeable mounting thereon of known wood wheels. It is the primary object, therefore, of this invention to provide a demountable wood wheel or skeleton wheel spider for interchangeable use on such a hub.

To facilitate an understanding of the invention, the drawing appended hereto illustrates in Figs. 1 and 2 respectively diametric sections through a front wheel and through a rear wheel embodying the combination of the wood wheel spider and the Ford wire wheel hub.

Describing the invention with reference to the drawing for illustrative purposes, the front wire wheel hub of Fig. 1 comprises the cylindrical hub barrel 11 and hub flange 12, the latter adapted to carry the brake drum 13.

The demountable wheel spider of the present invention comprises a radiant series of wood spokes 14 assembled within the steel felly 15, which in turn receives the tire-carrying rim 16. The spokes 14 are mitered at their abutting ends in the usual manner and provide a central hub-receiving opening bounded by the inner ends of the spokes. Alternate pairs of spokes are permanently attached by ferrule rivets 17 to the flange 18 of the hub shell. These ferrules may advantageously be disposed between the miters of the alternate spokes and are upset at their rear ends either directly against the spoke or within apertures provided at intervals in a metal annulus 19 lying against the rear faces of the spokes about the central opening as shown in the lower portion of Fig. 1.

Alternating with the rivets 17 and lying within the miter between alternate pairs of spokes are tubular bolts 20 having coned shoulders 21 seated within beveled openings of the shell flange 18 and provided with polygonal heads 22 whereby they may be drawn into clamping relation with the threaded ends 23 of studs having polygonal heads 24 seated within the permanent flange 12 of the hub and thereby prevented from turning. The hub shell comprises a barrel which envelops the permanent hub barrel 11 and extends both to the front and to the rear of the shell flange 18 as shown at 25 and 26. This hub flange extends forwardly to a point substantially in the plane of the forward end of the hub barrel and is there exteriorly provided with a hub cap 27 threaded, spun or pressed in place as indicated at 28. The extension 26 of the shell rearwardly from the shell flange 18 is less than the width of the spokes 14 and short of the permanent hub flange 12 whereby to secure lightness of construction and non-interference in mounting, said shell portion 26 being likewise of a larger diameter than the permanent hub barrel 11 which it envelops.

Forwardly of the shell flange 18 and consequently forwardly of the spoke plane and the tread plane of the wheel the portion 25 of the shell barrel is provided with an inwardly extending flange or rib 29, the interior diameter of which is of such size as to approximate but normally be out of contact with the permanent hub barrel.

Having reference to Fig. 2 of the drawing, the construction of the skeleton wood wheel or spider is identical with that illustrated in Fig. 1 for purposes of interchangeability as between front and rear hubs. Herein the construction of the permanent hub corresponds to the Ford rear hub for wire wheels, the barrel 11a being conical rather than cylindrical as in the case of the front hub 11 shown in Fig. 1. In this case the interior flange or rib 29 cooperates with an exterior flange or rib 30 of the permanent hub. The interior diameter of the one closely approximates the exterior of the other but they are normally out of contact.

The normal out of contact relation between the internal rib 29 and the front hub barrel and of the internal rib 29 and the external rib 30 of the rear hub barrel has for its purpose to secure an easy mounting of the wheel upon the hub and a centering of the same for the placement of the clamping bolts 20. The load is designed to be carried primarily by the bolts 20 and the hub flange 12, but in case of excessive side thrust, the adjacent surfaces of the rib 29 and the hub barrel 11 in the one case and of the rib 29 and the rib 30 in the other case come into contact and sustain such abnormal load.

It will be understood that the parts of the skeleton wheel or spider are normally held together by the rivets 17 cooperating with the sleeve flange 18 in the hub zone and by the felly 15 and rim 16 in the peripheral zone; that only when the skeleton wheel is to be assembled upon the hub, whether front or rear, are the clamping bolts 20 inserted in place, one between each pair of rivets, and the connection thereby made with the permanent hub flange 12 and the hub shell brought into enveloping relation with the permanent hub barrel.

I claim:

1. The combination with the permanent barrel and flange of a vehicle hub, of a skeleton wheel for interchangeably mounting thereon comprising a radiant series of spokes, a shell enveloping the hub barrel and having intermediate its two ends a flange overlying the front face of the spokes, the shell barrel extending to the rear within the central spoke opening and forming an inner abutment for the spokes, the shell having an internal rib approximating contact with the hub barrel, an annular series of attaching members permanently connecting the shell flange and spokes, and an annular series of members detachably connecting the shell flange and hub flange, the permanent and detachable connecting members alternating, the permanent flange provided on its front face with an annular seat for the skeleton wheel.

2. The combination with the permanent barrel and flange of a vehicle hub, of a skeleton wheel for interchangeably mounting thereon comprising a radiant series of spokes, a shell enveloping the hub barrel and having intermediate its two ends a flange overlying the front face of the spokes, the shell barrel extending to the rear within the central spoke opening to a distance short of the spoke width and forming an inner abutment for the spokes, the shell having forwardly of the plane of the spokes an internal rib with an inner diameter approximating the external diameter of the hub barrel, an annular series of attaching members permanently connecting the shell flange and spokes, and an annular series of members detachably connecting the shell flange and hub flange, the permanent and detachable connecting members alternating, the permanent flange provided on its front face with an annular seat for the skeleton wheel.

3. The combination with the permanent barrel and flange of a vehicle hub, of a skeleton wheel for interchangeably mounting thereon comprising a radiant series of spokes, a shell enveloping the hub barrel and having intermediate its two ends a flange overlying the front face of the spokes, the shell extending to the rear within the central spoke opening to a distance short of the spoke width and forming an abutment for the spokes, the shell and hub barrel having opposed ribs approximating but normally out of contact, an annular series of attaching members permanently connecting the shell flange and spokes, and an annular series of members detachably connecting the shell flange and hub flange, the permanent and detachable connecting members alternating, the permanent flange provided on its front face with an annular seat for the skeleton wheel.

4. The combination with the permanent barrel and flange of a vehicle hub, of a skeleton wheel for interchangeably mounting thereon comprising a radiant series of spokes, a shell enveloping the hub barrel and having intermediate its two ends an external flange overlying the front face of the spokes, the shell extending to the rear within the central spoke opening to a distance short of the spoke width and forming an inner abutment for the spokes, the shell and the hub barrel having forwardly of the plane of the spokes oppositely disposed ribs, the inner diameter of the shell rib and the outer diameter of the hub rib approximating each other but being normally out of contact, an annular series of rivets connecting the shell flange and spokes, and an annular series of detachable bolts connecting the shell flange and hub flange, the rivets and bolts alternating with each other and being disposed between the mitered ends of adjacent spokes.

5. The combination with the permanent barrel and flange of the Ford wire wheel hub, of a skeleton wood wheel for interchangeably mounting thereon comprising a radiant series of spokes, a shell for enveloping the hub barrel and having intermediate its two ends a flange overlying and permanently secured to the front face of the spokes, the shell extending to the rear within the central spoke opening to a distance short of the spoke width and forming an inner abutment for the spokes, the shell having forwardly of the plane of the spokes an internal rib approximating but normally out of contact with the permanent hub barrel, and an annular series of detachable bolts connecting the shell flange and hub flange, the permanent hub flange provided on its front face with an annular seat for the skeleton wheel.

6. The combination with the permanent barrel and flange of a vehicle hub, of a skeleton wheel for interchangeably mounting thereon comprising a radiant series of spokes, a shell enveloping the hub barrel and having intermediate its two ends a flange overlying the front face of the spokes, the shell barrel extending to the rear within the central spoke opening and forming an inner abutment for the spokes, the shell having approximate contact with the hub barrel forwardly of the spoke plane, an annular series of attaching members permanently connecting the shell flange and spokes, and an annular series of attaching members detachably connecting the shell flange and hub flange, the permanent and detachable connecting members alternating, and the permanent flange providing on its front face a seat for the skeleton wheel.

7. The combination with the permanent barrel and flange of a vehicle hub, of a skeleton wheel for interchangeably mounting thereon comprising a radiant series of spokes, a shell enveloping the hub barrel and having intermediate its two ends a flange overlying the front face of the spokes, the shell barrel extending to the rear within the central spoke opening and forming an inner abutment for the spokes, the shell having forwardly of the spoke plane an internal rib with an inner diameter approximating but normally out of contact with the hub barrel, an annular series of attaching members permanently connecting the shell flange and spokes, and an annular series of attaching members detachably connecting the shell flange and hub flange, the permanent and detachable connecting members alternating, and the permanent flange providing on its front face a seat for the skeleton wheel.

8. The combination with the permanent barrel and flange of a vehicle hub, of a wheel for interchangeably mounting thereon comprising a wheel body, a shell enveloping the hub barrel and having intermediate its two ends a flange overlying the front face of the body, the shell barrel extending to the rear within the central wheel opening and forming an inner abutment for the body, the shell having an internal rib approximating contact with the hub barrel, an annular series of attaching members permanently connecting the shell flange and wheel body, and an annular series of members detachably connecting the shell flange and hub flange, the permanent and detachable connecting members alternating, the permanent flange provided on its front face with an annular seat for the wheel.

In testimony whereof I have hereunto subscribed my name.

ANDREW S. VAN HALTEREN.